(12) United States Patent
Nelson et al.

(10) Patent No.: US 7,457,689 B2
(45) Date of Patent: Nov. 25, 2008

(54) PROCESS CONTROL METHODOLOGIES FOR BIOFUEL APPLIANCE

(75) Inventors: Eric W. Nelson, Minneapolis, MN (US); Marion L. Mast, Blooming Prairie, MN (US)

(73) Assignee: Hestia Heating Products, Inc., Minneapolis, MN (US)

( * ) Notice: Subject to any disclaimer, the term of this patent is extended or adjusted under 35 U.S.C. 154(b) by 0 days.

(21) Appl. No.: 11/550,500

(22) Filed: Oct. 18, 2006

(65) Prior Publication Data

US 2008/0097649 A1 Apr. 24, 2008

(51) Int. Cl.
*G05D 23/00* (2006.01)
(52) U.S. Cl. .................. 700/299; 110/190; 126/100; 126/500; 126/501; 126/502; 165/287; 700/274; 700/275; 700/300
(58) Field of Classification Search ......... 700/274–278, 700/299, 300; 44/530–535, 605–606; 110/190, 110/191, 101 CF, 101 CA, 233, 259, 110, 110/186, 188, 297; 126/73, 152 R, 152 B, 126/100, 104 A, 104 R, 110 E, 112, 116 A, 126/502; 60/321; 165/66, 107, 287, 288, 165/289, 290, 291, 292, 293, 299, 300; 241/31, 241/33, 34, 48, 57; 431/68
See application file for complete search history.

(56) References Cited

U.S. PATENT DOCUMENTS

| | | | |
|---|---|---|---|
| 2,524,868 | A | 10/1950 | Worsham |
| 4,312,278 | A | 1/1982 | Smith et al. |
| 4,619,209 | A | 10/1986 | Traeger et al. |
| 4,947,769 | A | 8/1990 | Whitfield |
| 5,001,993 | A | 3/1991 | Gramlow |
| 5,123,360 | A | 6/1992 | Burke et al. |
| 5,137,010 | A | 8/1992 | Whitfield et al. |

(Continued)

FOREIGN PATENT DOCUMENTS

DE 3226877 A1 1/1984

(Continued)

OTHER PUBLICATIONS

Harman Stove Company, "The Harmon P61 & P61A Pellet Stoves", Brochure, 4 pages.

(Continued)

*Primary Examiner*—Paul L Rodriguez
*Assistant Examiner*—Carlos Ortiz Rodriguez
(74) *Attorney, Agent, or Firm*—Nawrocki, Rooney & Sivertson, P.A.

(57) ABSTRACT

Apparatus for controlling the operation of a biomass stove utilizes three proportional integral derivative (PID) controllers as part of a closed loop to control the fuel feed rate, the convection fan speed and the combustion fan speed. The first loop controls room temperature, the second loop controls the convection fan speed and the third loop controls the combustion fan. Appropriate temperature readings are utilized for the first and second loop. The third loop, which utilized feedback of the ratio between the heat exchanger temperature to the exhaust temperature, in addition to measuring these temperatures also references a library of look-up tables of such ratios over the entire heat range of the stove that have been correlated to combustion efficiency, as an input. This enables the operator to optimize the heat output for any operating point.

13 Claims, 3 Drawing Sheets

U.S. PATENT DOCUMENTS

| | | | |
|---|---|---|---|
| 5,285,738 A | | 2/1994 | Cullen |
| 5,357,879 A | * | 10/1994 | Shiono et al. ................ 110/188 |
| 5,488,943 A | | 2/1996 | Whitfield et al. |
| 5,873,356 A | * | 2/1999 | Vossler et al. ............ 126/110 E |
| 6,336,449 B1 | | 1/2002 | Drisdelle et al. |
| 7,004,084 B1 | | 2/2006 | Anderson et al. |
| 7,241,135 B2 | * | 7/2007 | Munsterhuis et al. ......... 431/12 |
| 2004/0194679 A1 | | 10/2004 | Mendive et al. |
| 2004/0200394 A1 | | 10/2004 | Krumrei |
| 2007/0137537 A1 | * | 6/2007 | Drisdelle et al. ............ 110/297 |

FOREIGN PATENT DOCUMENTS

| | | |
|---|---|---|
| EP | 0482306 A2 | 4/1992 |
| GB | 2072831 A | 10/1981 |
| WO | WO-2006/081600 A1 | 8/2006 |

OTHER PUBLICATIONS

Harmon Stove Company, "The Harmon PC 45 Corn/Pellet Stove", Installation & Operating Manual, 28 pages.

* cited by examiner

PROCESS CONTROL METHODOLOGIES FOR BIOFUEL APPLIANCE

TECHNICAL FIELD

The present invention generally relates to biofuel burning heating devices, more particularly, to devices for the efficient production of thermal energy from biofuels such as pelletized, minimally processed, and/or raw biomass, and more particularly still, to process control methodologies for such devices.

BACKGROUND OF THE INVENTION

With the increasing cost of gas and fuel oil, in combination with an ever increasing social consciousness directed to conservation and recycling, further attention is being directed to alternate fuel sources such as wood and other solid/semi-solid combustibles or combustible residues. A resurgence of interest and attention is being given to biofuels, biofuel combustion processes and biofuel combustion devices.

"Biofuel" is a term generally understood to embrace any fuel derived from biomass, namely, recently living organisms or their metabolic byproducts. Agricultural products specifically grown for use as biofuels include, among other things, corn, soybeans, flaxseed, rapeseed and hemp. Furthermore, biodegradable outputs from industry, agriculture, forestry, and households, e.g., straw, timber, manure, sewage and food leftovers, can also be used to produce "bioenergy."

Heaters or stoves, more generally, "heating appliances," for burning biofuels are known to provide acceptable alternative heat sources for conventional heating units such as gas, electric and oil furnaces. Biomass pellets of a variety of compositions are well-known fuel sources, as are cereal grains such as corn and wheat, to name but a few.

While many perceive pelletized fuel sources as being especially advantageous due to size uniformity and low moisture content, efficient energy producing combustion nonetheless requires attentive regulation of a variety of combustion parameters, for example, and without limitation, draft regulation, backfire prevention, thorough fuel conversion, ash management/conditioning and exhaust flue temperature. In light of, among other considerations, increasing costs for pelletized biofuels due to increasing, and in some places, unmet demands for same, it is believed especially advantageous and desirable to utilize raw biomass fuel sources such as grains, which generally are readily available, and favorably priced on a per unit of energy produced basis.

Shortcomings and/or challenges associated with efficient biofuel combustion have been, and continue to be well documented. For instance, U.S. Pat. No. 7,004,084 (Anderson et al.), the contents of which are incorporated by reference, identifies a variety of challenges and, as the case may be, heretofore known approaches to those challenges, namely those of: fuel delivery (1:36 et seq.); initial fuel ignition and startup (1:60 et seq.); clinker formation (2:34 et seq.); and, thermal operational optimization (2:45 et seq.). Although incremental improvements have arguably been made, there remains ample room for improvement (see, e.g., copending U.S. Pat. application Ser. No. 11/550,494, filed Oct. 16, 2006, entitled "Apparatus for Combustion of Biofuels," incorporated herein by reference in its entirety.

Heretofore known combustion appliances are generally limited in their dynamic range, i.e., their ability to run at both very high and very low heat outputs, even when utilizing a single, uniform fuel source, e.g., a pelletized biomass, let alone when the biofuel may be variable from one heating event to another. Furthermore, heretofore known combustion appliances require initial set-up or setting of combustion regulating parameters, whether a factory or "on-site" setting, and commonly require periodic resetting or adjustment of the initially selected parameters.

Temperature of the air streams within the appliance are an important operational consideration or parameter. In biomass burning devices or appliances, one of the most important and pervasive factors or parameters in establishing and/or maintaining combustion efficiency is the hot air exhaust temperature.

As should be readily appreciated, heat can enter the room either via the heated convection air stream, through passive convection directly from heated stove surfaces, or through radiation from heated stove surfaces. Heat carried to the outside by the exhaust gas is for all practical purposes wasted. Because of this fact, lowering the temperature of exhaust gases will improve the stove efficiency. There is however a limit to this approach.

As is generally well known, as exhaust gas temperatures fall below about 250° F., condensation can occur in the exhaust flue. This condensation is usually highly acidic which produces rapid deterioration of the flue. To avoid this problem, while still maintaining the best feasible efficiency, the exhaust temperature should be controlled to be as close to about 250° F. as possible. Thus, for a given burn rate, which is primarily and advantageously controlled by the fuel feed rate, two controllable parameters are available for regulation in furtherance of managing the exhaust temperature, namely, the air flow rates associated with combustion and convection/recirculation.

In light of the foregoing considerations, and relative to the present state of the art and improvements or improved features in and of the new, i.e., last generation of biofuel heaters/heating appliances, there nonetheless remains great room for device and process control improvement, especially in the arena of non-industrial applications. It remains highly desirable to provide an apparatus which can, for, all practical purposes, efficiently operate with no onsite calibration, modification, alteration, upgrade, retrofit, etc., and further still, an apparatus which can readily process a variety of biomass feed stocks as fuel, i.e., either or any of pelletized biomass, semi-processed biomass, or raw biomass, separately, or in combination. Furthermore, it remains desirable and advantageous to more efficiently handle fuel distribution and management, as well and improve upon heretofore known ash conditioning or management techniques. Finally, there remains a need to eliminate ignition and start-up shortcomings; to provide and/or support a combustion process which is less dependent upon the plurality of heretofore adjustments in relation to one or more of fuel feed type, character or quality, fuel feed rate, and/or combustion air dynamic, flow and character; and, to provide one or more dynamic process/operational controls in furtherance of optimal/maximum thermal efficiency for such appliances under a variety of conditions and/or designated parameters.

SUMMARY OF THE INVENTION

In-as-much as a heating apparatus or appliance for the combustion of highly variable biofuel feed stocks is generally provided, see Applicants' previously cited co-pending application, the subject invention is advantageously directed to a variety of active, closed loop feedback systems, i.e., combustion regulating, process control methods or methodologies, associated with such heating appliances or the like. Appliances or systems contemplated for control via one or more of the subsequent detailed methodologies are generally characterized by a combustion device having a burn box or equivalent structure, heat transfer means operatively linked therewith, a fuel feed system and supply, a combustible air intake/discharge system, a recirculating or convection air system, and at least a single proportional integral derivative (PID) controller or the like.

Operatively, outside fresh air is conducted into the burn box, through a fresh air duct of the intake/discharge system, while fuel is likewise introduced at a rate reflecting the sought after ambient room temperature. Gaseous combustion products and the heat associated therewith is carried past heat transfer means, e.g., a shell and tube heat exchanger. Thereafter, the gaseous combustion products are exhausted into the atmosphere via an exhaust fan of the intake/discharge system. Recirculating air for environmental heating is conducted from the environment to be heated into the heat exchanger, through a recirculating air duct, and is exhausted back into the room, through a recirculating air exhaust duct, by a recirculating or convection air fan.

The combustion regulating methodologies of the instant invention are generally directed to the fuel feed rate, the convection fan speed, and the combustion fan speed. Three closed loop feedback systems are contemplated for the elements to be regulated or controlled, more particularly, each control methodology or system advantageously utilizes a PID algorithm, executable by the at least one PID controller, to adjust the target output.

In a first process control methodology, a target environmental ambient temperature is selected for input to a controller of a first control system; an environmental ambient temperature is detected and selectively input for comparison to the target environmental ambient temperature by the controller; and, the fuel feed system is signaled in furtherance of achieving and maintaining the target environmental ambient temperature. In a further process control methodology, an exhaust temperature is detected and selectively input for comparison to a preselect, preprogrammed exhaust temperature by a controller of a second control system; and, a convection fan is signaled in furtherance of achieving and maintaining said preselect, preprogrammed exhaust temperature. In yet a further process control methodology, a ratio of periodically detected exhaust and heat exchanger temperatures is selectively and automatically input to a controller of a third control system for comparison with a target ratio of exhaust and heat exchanger temperatures, wherein the target ratio, as a function of fuel type and fuel feed rate, correlates to combustion efficiency, the combustion fan being signaled in furtherance of achieving and maintaining the target ratio of exhaust and heat exchanger temperatures.

Present stove control systems provide a limited series of steps which are invariant in a step size as the system responses to time changes. In contradistinction to heretofore known approaches, each control system of the subject process control systems utilize a PID algorithm in a control loop to adjust a target parameter, e.g., throughput/output rates (i.e., motor speeds) according to or in response to (i.e., in proportion to) the input signal.

PID algorithms, which are well-known in the art and explained in a number of textbooks, require an input value which is used to calculate three output quantities. These three quantities are summed to provide the PID system output as a control. The first PID quantity applies a first gain to the input signal, the second quantity differentiates the input signal and applies a second gain to the differential, and the third quantity integrates the input signal and applies a third gain to the integral. These three outputs are summed to provide the output control signal. In a PID system, the time response can be set up to provide an essentially unlimited number of different time response curves. This permits provisions for any desired time response for the system.

The first process control method uses one of two mechanisms by which a user may select a target or desired room temperature. A first mechanism permits local temperature selection, whereas a second mechanism permits remote temperature selection in furtherance of providing a forcing function for a summing point for the first PID system. The null signal for the summing point is provided by measuring the actual room temperature. The actual room temperature is impacted by the fuel feed rate which is controlled by the first PID output, i.e., the output adjusts the fuel auger speed. Essentially a large difference between these compared quantities will cause a higher feed rate, and a small difference will cause a smaller feed rate. The actual feed rate response curve will be modified by the PID differential and integral gain adjustments as discussed above.

The second process control method uses the exhaust temperature to control the convection fan speed. The speed of the convection fan is determined by the difference between the real time measured exhaust temperature, and a preset exhaust temperature. Here again, the feedback from the convection fan speed to the exhaust temperature is indirect since a rise in exhaust temperature above the desired temperature will cause the convection fan to speed up and remove more heat from the exhaust. The actual speed response curve will again be modified by the PID gain adjustments as discussed above.

The third process control method uses ratios of exhaust temperatures to heat exchanger temperatures to control the combustion fan. Inherent in the control methodology is an ability to discern between/among select biomass fuels, i.e., the methodology is premised upon detecting distinguishing characteristic of the biofuel being fed to the combustion device, either directly (e.g., via density sensing of the fuel being fed) or indirectly (e.g., via periodic real time fuel feed system feedback).

Utilizing known empirical means or the like, for a variety of select fuel types, e.g., corn, wood, etc., or fuel designation, e.g., raw, pelletized, etc., and for selective feed rates thereof, a library of look-up tables comprising a variety of look-up tables corresponding to the select fuel types, and correlating combustion efficiency and ratios of exhaust and heat exchanger temperatures, are provided for reference in furtherance of process control. The feedback signal is provided by calculating the real time ratio of the sensed exhaust temperature to the sensed heat exchanger temperature so as to provide an equivalent null signal. The actual time response curve will again be modified by the PID differential and integral gain adjustments as discussed above.

Present stove control systems provide a limited series of steps which are invariant in step size as the system responses to time changes. Since the PID system can be set up to provide an essentially unlimited number of different time response curves, this permits providing any desired time response for the system the various system outputs can be time optimized. Additional items, advantages and features of the various aspects of the present invention will become apparent from the description of its preferred embodiments, which description should be taken in conjunction with the accompanying drawings.

BRIEF DESCRIPTION OF THE DRAWINGS

In the drawings, like reference characters generally refer to the same parts throughout the different views. Also, the draw

DETAILED DESCRIPTION OF THE INVENTION

A preferred, non-limiting combustion device and/or a heating appliance is generally depicted in co-pending U.S. patent application Ser. No. 11/550,494, filed Oct.18, 2006, entitled "Apparatus for Combustion of Biofuels," previously incorporated herein by reference in its entirety. The PID control loops for regulating combustion parameters of said device(s), or such device(s) generally, are depicted in FIGS. 1-3, namely, the regulation of fuel feed rate in response to the selection of a target environmental ambient temperature (FIG. 1); the regulation of the convection or recirculation air throughput as a function of a preselect exhaust temperature (FIG. 2); and, the regulation of the combustion air throughput as a function of combustion efficiency, i.e., via a preselect target ratio of exhaust/heat exchanger temperature calibrated to said efficiency (FIG. 3)

In-as-much as a combination of each of the process control methodologies is especially advantageous and contemplated, such combustion regulation need not be so limited, e.g., each approach alone, or each approach in combination with one other, etc. are believed to impart technical and/or functional advantage for and in relation to heretofore known commercial devices/appliances. Likewise, in-as-much as the methodologies depicted and described are intended to be digital in nature, they need not be so limited, analog signaling being well within the skill of such artisans.

Figure 1:
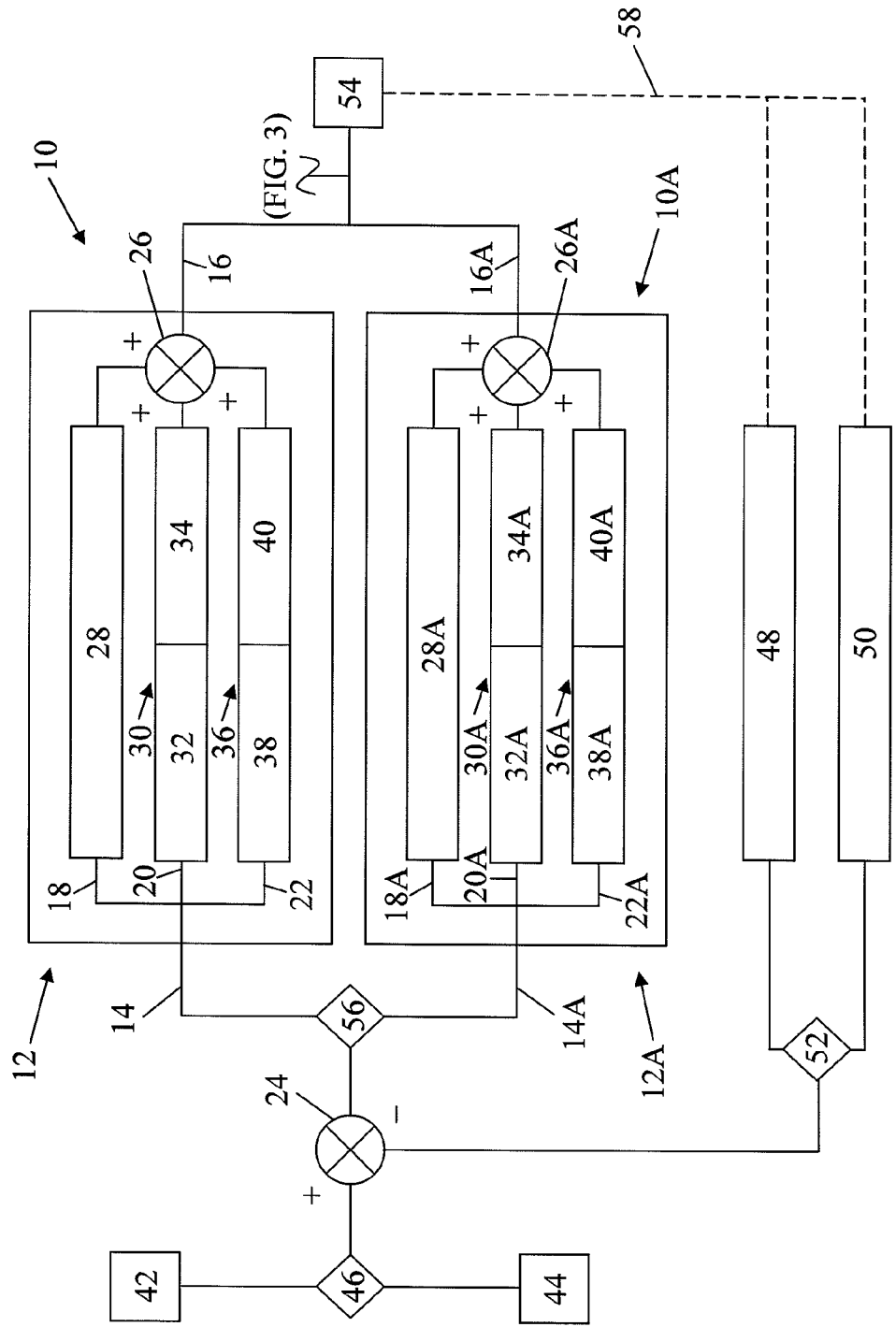
- FIG. 1 is a block diagram representing a PID control loop associated with the fuel feed rate.
Figure 2:
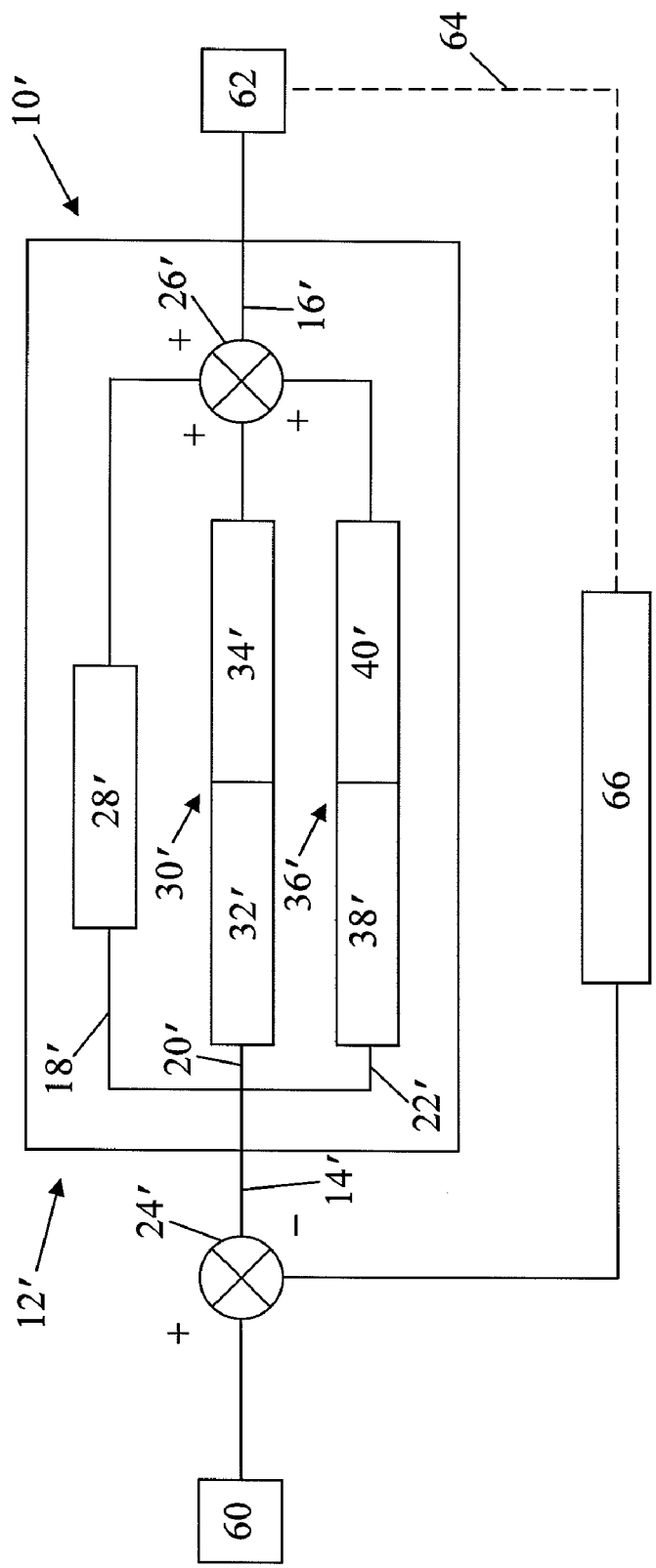
FIG. 2 is a block diagram representing a PID control loop associated with the convection fan; and, FIG. 3 is a block diagram representing a PID control loop associated with the combustion fan.
Figure 3:
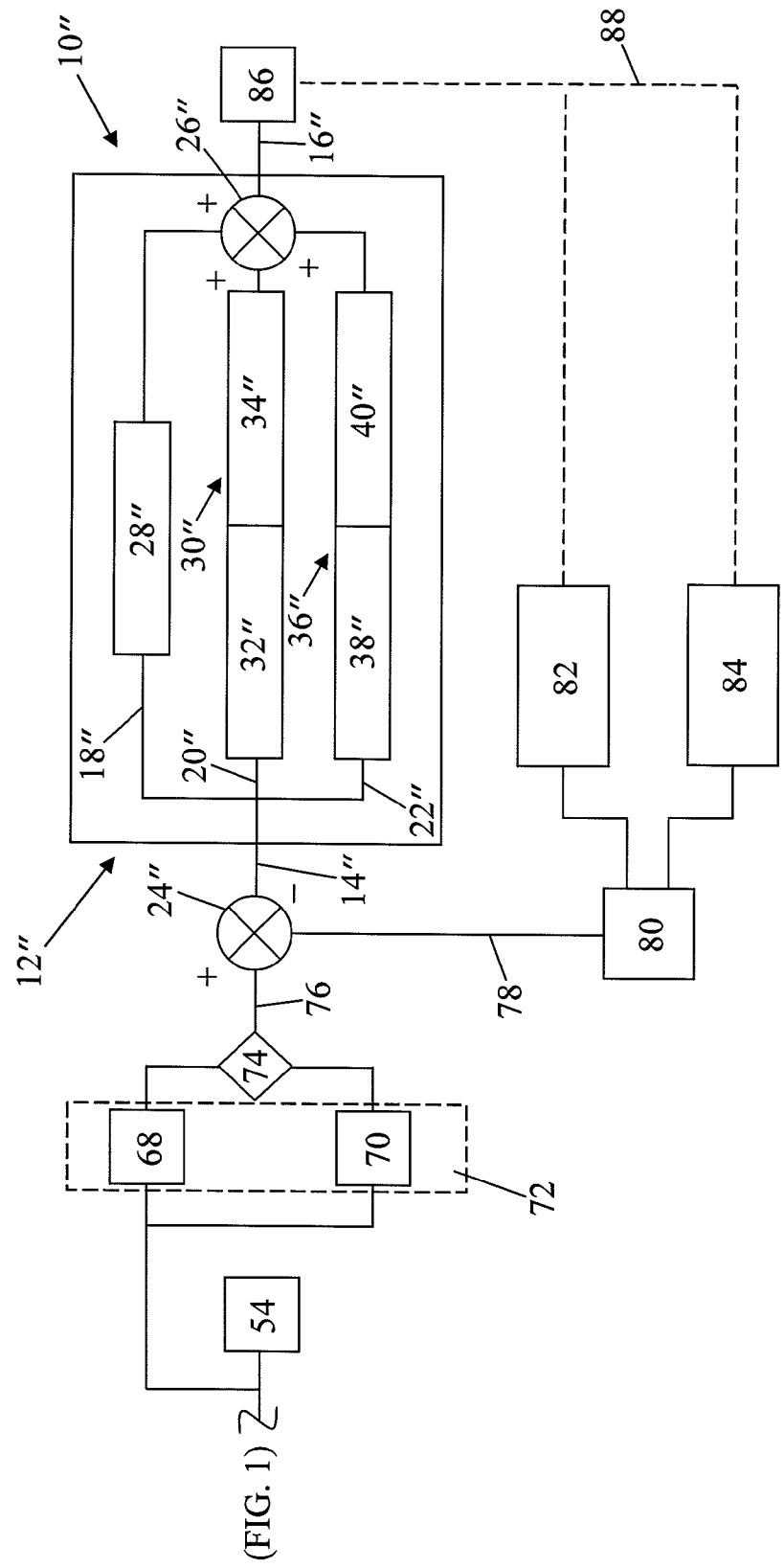

With continued general reference to FIGS. 1-3, FIG. 1 depicts a pair of proportional integral derivative (PID) systems 10, 10A, wherein associated algorithms are executed in PID controllers 12, 12A in furtherance of combustion parameter regulation. Similarly, with reference to FIG. 2, the algorithm for PID 10' is executed in controller 12'; with reference to FIG. 3, the algorithm for PID 10" is executed in controller 12".

As will be later discussed, the illustrated control system duality of FIG. 1, and also indirectly manifest in the control scheme of FIG. 3, supports utilization of either of two biomass fuel types of sufficiently different quality/character, e.g., wood pellet versus corn, in an appliance capable of, or adapted for use of greater than one "type" of biomass fuel for regulating, in the instant case, fuel feed rate. Furthermore, it should be readily appreciated that while the following detailed description is directed to, or otherwise premised upon, a feed characterized by one of two alternative biomass fuel types, it need not be so limited; to wit, a single fuel type, or up to "n" different fuel types are similarly contemplated, with adaptations of the subject process control or regulating methodologies generally following that aim.

As should be readily apparent, the components, connection and general operation of controllers 12/12A (FIG. 1), 12' (FIG. 2) and 12" (FIG. 3) are substantially identical. To minimize repetition, only the operation and connections of controller 12 (FIG. 1) will be subsequently described in detail: controller 12A related elements (FIG. 1) are distinguished by adding an "A" after common reference numerals representing common elements or features with regard to those of controller 12 of FIG. 1; likewise, controller 12' related elements (FIG. 2) are distinguished by adding a single prime (') after common reference numerals representing common elements or features with regard to those of controller 12 of FIG. 1; and, finally, controller 12" related elements (FIG. 3) are distinguished by adding a double prime (") after common reference numerals representing common elements or features with regard to those of controller 12 of FIG. 1.

Referring now to FIG. 1, more particularly, controller 12 thereof, a discussion of general proportional integral derivative system elements and functions common to FIGS. 1-3 is provided. As illustrated, controller 12 of system 10 receives input 14 and transmits or otherwise sends or issues output 16. Three processing or execution paths are shown between input 14 and output 16, namely, paths 18, 20 and 22. The input or origin to/of paths 18, 20 and 22 (i.e., input 14) is the output of summing point 24, with output 16 of each of paths 18, 20 and 22 reflecting the summation of each such path at summing point 26.

In connection to path 18, processing thereof proceeds via sub-processor 28. The error of input 14 is multiplied by a preprogrammed or preselect fixed gain, e.g., gain one. In connection to path 20, processing thereof proceeds via sub-processor 30. The derivative of input 14 is first calculated via portion 32 of sub-processor 30, and the result is multiplied by a preprogrammed or preselect fixed gain, e.g., gain two, via portion 34 of sub-processor 30. Finally, in connection to path 22, processing thereof proceeds via sub-processor 36. The integral of input 14 is first calculated via portion 38 of sub-processor 36, and the result is multiplied by a preprogrammed or preselect fixed gain, e.g., gain three, via portion 40 of sub-processor 36.

As previously noted, the combustion or operational parameter regulation depicted in FIG. 1 is fuel feed rate as a function of select target environmental ambient temperature. Generally, means are provided to set the target or sought after temperature, i.e., room temperature. In relation to the preferred embodiments of the control methodologies of the subject invention, and appliances incorporating same, a single controller input is intended to be user selected, namely, the target environmental ambient temperature.

Target setting means advantageously, but not necessarily, is characterized by twofold or dual mechanisms, each generally configured as a keypad, namely, and more particularly, an appliance keypad 42 (i.e., a keypad integral or "hard-wired" to/with the appliance), and a remote keypad 44 (e.g., a remote radio selection device or the like). Advantageously, but not necessarily, the integral input means is designated as the system default (i.e., upon expiration of a preselect, preprogrammed period of inactivity, auto-selector 46 will reference the integral means; contrariwise, upon user manipulation of the remote selector means, auto-selector 46 preferentially overrides any prior integral selector means signal).

In furtherance of the sought after parameter regulation of FIG. 1, and the described user selection means, corresponding ambient monitoring/sensing means are provided, and operatively integral with the controller, namely integral 48 and remote 50 temperature sensing and signaling means. The subject temperature sensing and signaling means are indirectly linked to, on the one hand, summation point 24, for effective consideration by PID controller 12/12A via auto-selector 52 which essentially functions as auto-selector 46, and the controller of the fuel feed system (e.g., auger gear motor 54) on the other hand.

As alluded to earlier, the subject combustion parameter regulating methodologies provide a variety of heretofore unrealized advantages, among other things, the ability to discern and respond to the character and/or quality of the fuel, more particularly, the nature of the fuel type (e.g., cereal grains versus wood, etc.). In connection to the control or regulation scheme of FIG. 1, a further selector is provided (i.e., auto-selector 56) in furtherance of choosing between controllers 12 and 12A, each of which correlates to/with, for example, a cereal based fuel such as corn (i.e., controller 12), and a pulp based fuel such as pelletized wood (i.e., controller 12A). As should be readily appreciated, as the heating quality and capacity of the numerously heretofore known biomass fuels are highly variable, the subject functionality advantageously aids the control methodology of FIG. 1, and as will be later discussed, the control methodology of FIG. 3.

Functionally, an appliance operator selects a target environmental ambient temperature via inputting same to system 10, subsequent to selection via auto-selector 46, and assessment at summing point 24 in relation to the measured or actual environmental ambient temperature, in furtherance of having the system respond to the user request or demand. Essentially, a large difference between these quantities will cause a proportional, i.e., higher, feed rate, and a small difference will cause a proportional, i.e., smaller, feed rate. The actual time response curve will be modified by the PID derivative and integral adjustments as discussed above.

Output 16/16A of controller 12/12A is operatively united with fuel auger motor 54 which controls, via adjustment, the speed of the motor in direct proportion to the size (i.e., magnitude) of the value of output 16. Dashed line 58 represents the indirect connection from the auger motor 54 to means 48, 50 for sensing and signaling environmental ambient temperature. As previously noted, such means is indirectly linked, via selector 52, to a minus null input of summing point 24.

Referring now to FIG. 2, a mechanism to regulate appliance operation, more particularly, minimize waste heat in the appliance exhaust via regulation of a convection or recirculation fan, is illustrated. The subject methodology is advantageously independent of user input; a preselect, preprogrammed target exhaust temperature is provided as summing point input 60 for subsequent consideration by controller 12'. Preferably, but not necessarily, the target exhaust temperature is within the range of about 225-275° F., and commensurate with the contemplated range of biomass feed stocks, a target exhaust temperature of 250° F. is believed to be advantageous.

Output 16' of controller 12' is operatively united with convection fan 62 which controls, via adjustment, the speed of the motor thereof in direct proportion to the size (i.e., magnitude) of the value of output 16'. Dashed line 64 represents the operative linkage between the convection fan 62 and means for sensing and signaling real time exhaust temperature, e.g., a thermocouple 66 or the like. The sensed and signaled real time exhaust temperature is passed to a minus null input of summing point 24' in furtherance of assessment of the differential by the controller.

With regard to the subject response scheme, several advantages are offered. As is well known, contamination build-up (i.e., fouling) associated with heat exchanger tubes of heat transfer means is well known, and detrimental to optimal operation; less heat is transferred from the combustion air to the convection or recirculation air (i.e., heat is unintentionally exhausted). Such condition may be offset via an increase in the amount of circulation air introduced to the heat transfer means. The subject active feedback system senses, for example, an increase in the exhaust temperature, and responds with an increased recirculation air throughput, and thereby maintains maximum efficiency considerably longer, and more easily, than heretofore known approaches. A further desirable result is that the appliance so controlled is easier to set up at time of installation, since one of the most delicate variables, i.e., convection air throughput, is automatically set or established, rather than via establishment by a technician/user. Finally, it should be readily appreciated that the subject scheme can be adapted such that a user warning can issue upon detection of a preselect condition indicative of a drop in heat transfer efficiency (i.e., conditions giving rise to a maintenance or service call).

Referring now to FIG. 3, a mechanism to regulate appliance operation, more particularly, combustion efficiency is illustrated. Again, the subject methodology is advantageously independent of user input; a preselect ratio of exhaust to heater exchanger temperature, indicative of combustion efficiency of a select fuel type and feed rate, is provided as a summing point input for subsequent consideration by controller 12" in furtherance of controlling a combustion air throughput.

The instant regulation or control scheme preliminarily, and advantageously, detects the quality and/or character of relatively distinguishable biomass fuels, e.g., corn versus wood, as is likewise the case for the method of FIG. 1. For example, and without limitation, data relating to the fuel feed system, e.g., real time/periodic monitoring of the work of the auger gear motor, periodic density determination of the fuel occupying the feed hopper, etc., may be obtained and readily correlated to a select or designated fuel or fuel type of a variety of fuel types. In any event, and by generally known means or mechanisms, detection of fuel I (e.g., corn) or fuel II (e.g., wood) permits reference to a corresponding look-up table 68, 70 of a library of look-up tables 72 wherein look-up tables of the library of look-up tables correlate combustion efficiency data with ratios of exhaust and heat exchanger temperatures, and fuel I/II feed rates. As should be readily appreciated, means and/or mechanism establishing such correlations are well known, e.g., empirical means such as determining, for each fuel type, a combustion efficiency for a range of incremental temperature ratios for each fuel feed rate of a select range of fuel feed rates.

Functionally, with selection of look-up table "X" corresponding to fuel "X" from the library of look-up tables 72 via auto-selector 74, the target exhaust/heat exchanger ratio 76 is input to summing point 24" of system 10" for assessment relative to an input of an actual ratio 78 of same. The real time or actual ratio 78 is obtained via execution of a division operation in arithmetic operator or unit 80, using as inputs real time sensing and signaling values of both the exhaust 82 and heat exchanger temperatures 84.

Output 16" of controller 12" is operatively united with combustion fan 86 which controls, via adjustment, the speed of the motor thereof in direct proportion to the size (i.e., magnitude) of the value of output 16". Dashed line 88 represents the operative linkage between the combustion fan 86 and means for sensing and signaling real time exhaust 82 and heat exchanger 84 temperatures, e.g., via thermocouples or the like. The ratio 78 of the sensed and signaled real time exhaust and heat exchanger temperatures, as output from the arithmetic operator 80, is passed to a minus null input of summing point 24" in furtherance of assessment of the differential by the controller.

There are other variations or variants of the described methods of the subject invention which will become obvious to those skilled in the art. It will be understood that this disclosure, in many respects, is only illustrative. Although the various aspects of the present invention have been described with respect to various preferred embodiments thereof, it will be understood that the invention is entitled to protection within the full scope of the appended claims.

What is claimed is:

1. A combustion regulation method for a biofuel appliance characterized by heat transfer means, a fuel feed system, a combustion fan, a convection fan, and at least a single proportional integral derivative controller system wherein associated algorithms for controlling fuel feed rate, convection fan speed, and combustion fan speed are executed, said method comprising:
   a. selective, automatic inputting of a ratio of periodically detected exhaust and heat exchanger temperatures to said controller;
   b. selective, automatic inputting of a target ratio of exhaust and heat exchanger temperatures as a function of fuel type and fuel feed rate, said target ratio correlating to an optimal combustion efficiency for said fuel type and said fuel feed rate; and
   c. signaling said combustion fan in furtherance of achieving and maintaining said target ratio of exhaust and heat exchanger temperatures.

2. The combustion regulation method of claim 1 wherein said target ratio of exhaust and heat exchanger temperatures are selected from a look-up table of a library of look-up tables, each look-up table of said library of look-up tables correlates with a select fuel of fuels for feeding via said fuel feeding system.

3. The combustion regulation method of claim 2 wherein a first look-up table of said look-up tables of said library of look-up tables correlates with a fuel comprising cereal grain.

4. The combustion regulation method of claim 3 wherein a second look-up table of said look-up tables of said library of look-up tables correlates with a fuel comprising wood.

5. The combustion regulation method of claim 2 wherein said method further comprises detecting and selectively inputting an exhaust temperature, for comparison to a preselect exhaust temperature, by said controller system.

6. The combustion regulation method of claim 5 wherein said preselect exhaust temperature is within the range of about 225-275° F.

7. The combustion regulation method of claim 5 wherein said method further comprises signaling a convection fan in furtherance of achieving and maintaining said preselect exhaust temperature.

8. A process control method for a biomass combustion appliance having biomass fuel feed means, heat transfer means, a combustion air system, a recirculating air system, and a multifunction process controller for executing a series of proportional integral derivative control loops relating to fuel feed rate, convection fan speed and combustion fan speed, said method comprising:
   a. automatic detection of fuel type of fuel handled by the biomass fuel feed means;
   b. signaling the multifunction process controller of the detected fuel type of fuel handled by the biomass fuel feed means in furtherance of regulating a fuel feed rate of the biomass fuel feed means in response to a differential of a user select target environmental ambient temperature and a real time environmental ambient temperature; and,
   c. signaling the multifunction process controller of the detected fuel type of fuel handled by the biomass fuel feed means in furtherance of regulating a combustion air throughput of the combustion air system in response to differential of a predetermined ratio of exhaust and heat transfer means temperature, correlated with combustion efficiency data for a select fuel type of fuel types of fuel handled by the biomass fuel feed means as a function of select feed rates, and a select real time ratio of exhaust and heat transfer means temperature.

9. The process control method of claim 8 wherein automatic detection of fuel type of fuel handled by the biomass fuel feed means includes automatic detection of one or more of cereal grains and pulp.

10. The process control method of claim 8 wherein signaling the multifunction process controller of the detected fuel type of fuel handled by the biomass fuel feed means in furtherance of regulating a fuel feed rate of the biomass fuel feed means includes selecting a target environmental ambient temperature for input to said multifunction process controller.

11. The process control method of claim 10 wherein selecting a target environmental ambient temperature is accomplished via user input means comprising a key pad operatively linked to said multifunction process controller.

12. The process control method of claim 8 wherein signaling the multifunction process controller of the detected fuel type of fuel handled by the biomass fuel feed means in furtherance of regulating a combustion air throughput of the combustion air system in response to differential of a predetermined ratio of exhaust and heat transfer means temperature includes detecting and selectively inputting an exhaust temperature, for comparison to a preselect exhaust temperature, by said controller.

13. The process control method of claim 12 wherein said preselect exhaust temperature is within the range of about 225-275° F.

* * * * *